F. KESSELRING.
CONTINUOUS CURRENT DYNAMO.
APPLICATION FILED JULY 17, 1916.
1,346,213.
Patented July 13, 1920.
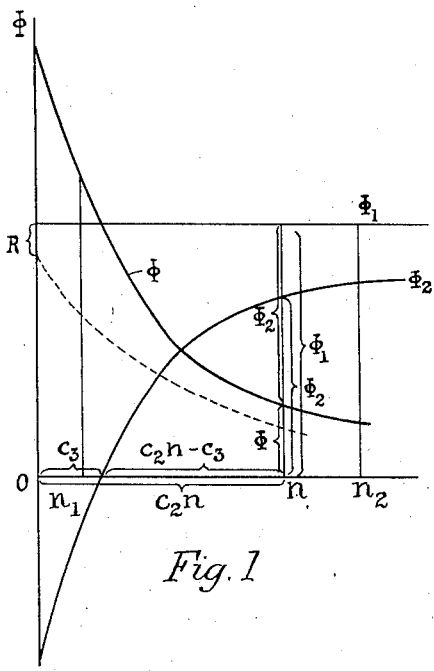
Fig. 1
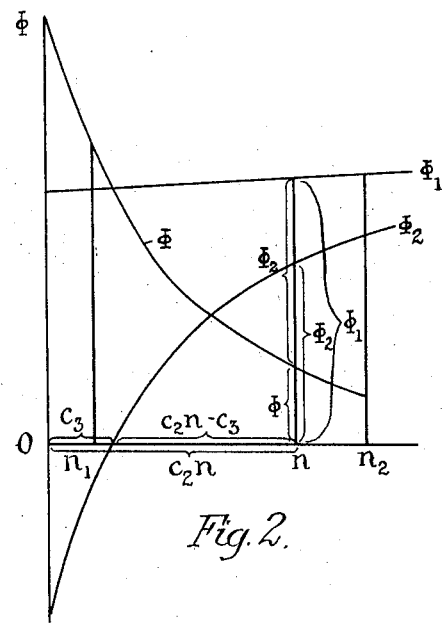
Fig. 2.
Fig. 3.
Fig. 4.
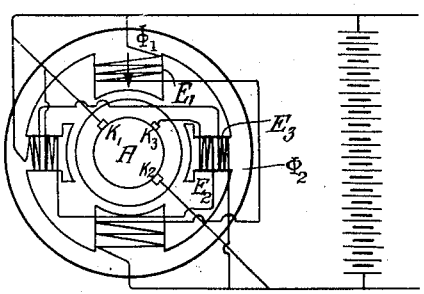
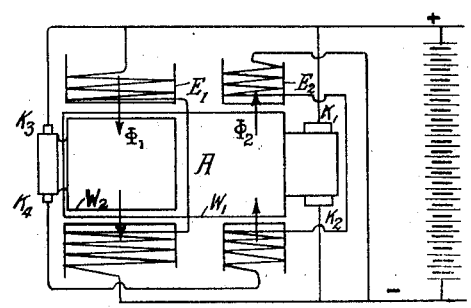
INVENTOR
Fritz Kesselring
BY
ATTORNEY

R
UNITED STATES PATENT OFFICE.

FRITZ KESSELRING, OF NEUHAUSEN, SWITZERLAND.

CONTINUOUS-CURRENT DYNAMO.

1,346,213.  Specification of Letters Patent.  Patented July 13, 1920.

Application filed July 17, 1916. Serial No. 109,800.

*To all whom it may concern:*

Be it known that I, FRITZ KESSELRING, a citizen of the Swiss Confederation, residing at Neuhausen, on the Rhine, Switzerland, have invented new and useful Improvements in Continuous-Current Dynamos, of which the following is a specification.

The invention relates to variable speed generators, where an approximately constant voltage is to be obtained at variable speed, without the provision of accessories, such as controlling resistances or the like.

It is an object of the invention to provide special means for obtaining automatic regulation of the generator during speed variations, so that at all times a constant voltage may be obtained, such as is necessary in train illumination, where the generator is driven by the shaft of the running wheels.

To the accomplishment of the principal object and others that will become apparent upon perusal of the specifications and claims forming a part thereof, the preferred embodiments of the invention are illustrated in the accompanying drawing, in which Figures 1 and 2 illustrate the curves of the different magnetic fluxes in the dynamo;

Fig. 3 indicates a two pole dynamo having main and auxiliary poles, the latter being provided with two sets of field coils, Fig. 4 indicates the dynamo provided with main and auxiliary poles, and an armature having two separate windings.

The E. M. F. $E = C_1 \varphi n$, wherein

E is the E. M. F. induced in the armature of a generator, $\varphi$ the resultant magnetic flux of the armature per pole pitch (periphery of the armature divided by the number of poles), $n$ the number of revolutions per minute and $C_1$ a constant.

It is immaterial in what manner the magnetic flux $\varphi$ is produced, and either an electromagnet, or a permanent magnet, or a combination of both may be adopted, constituting the field poles of the machine. To obtain a constant E. M. F. when the speed varies, it is necessary, of course, that the product $C_1 \varphi n$ should remain constant, and in view of the fact that the speed varies, $\varphi$ must change, such that the product will always remain the same, in other words, $\varphi$ must vary inversely to the number of revolutions $n$. To accomplish this end, the magnetic flux $\varphi$ is produced in the present instance by at least two component fluxes, namely 1) a constant main flux $\varphi_1$, which is produced either by a permanent magnet, or by an approximately constant number of ampere turns, or by a combination of both, and (2) a variable, auxiliary flux $\varphi_2$ directed oppositely to the main flux $\varphi_1$, and produced by a number of ampere turns $a^w n$ computed according to the formula: $a^w n = C_2 n - C_3$, wherein $c_2$ $c_3$ are constants and the constant $C_3$ may be zero.

The ampere turns of the auxiliary field poles, constituting the M. M. F. $C_2 n$ and producing the magnetic flux $\varphi_2$ varies directly as the number of revolutions, whereas the M. M. F. $C_3$ is approximately constant. The part $C_2 n$ directly in proportion to the speed produces in the air space a flux opposite to the direction of the flux $\varphi_1$, produced by the main field poles. The portion $C_3$ of the ampere turns provided on the auxiliary field poles is arranged to produce a magnetic flux of the same direction as the main flux. The ampere turns $C_3$ can, of course, also be replaced either wholly or in part by a permanent magnet, or, if preferred, they may be entirely dispensed with.

If $C_3$ were zero the $\varphi$-curve would have the form of the dotted line shown in Fig. 1, R being the residual magnetism of the auxiliary magnetic circuit. As may be seen, this curve is not inversely proportionate to the number of revolutions and would therefore not give a constant voltage. This curve would also make necessary a large and costly dynamo and for this reason it is important that $C_3$ is different from zero.

The approximately constant ampere turns of the main field poles producing the main flux $\varphi_1$, are obtained in the known manner by one or more windings energized by an approximately constant voltage. Or the flux is obtained by a permanent magnet, constituting main field poles, or by a combination of both arrangements. The same applies to the constant portion $C_3$ of the auxiliary flux $\varphi_2$. It may also be obtained by introducing into the circuit containing the ampere turns $C_2 n$ an approximately constant voltage of proper direction.

Thus, the $\varphi_2$ flux is obtained by two operative E. M. F.'s, one varying directly as the speed, and the other being approximately constant. The approximately constant flux of the $C_2 n$ circuit can be employed in combination with permanent magnets as well as with approximately constant additional ampere turns.

The ampere turns $C_2n$, varying directly as the number of revolutions, can also be obtained by arranging an armature winding adapted for direct current or a portion of such a winding to rotate at a speed proportional to the number of revolutions of the generator in an approximately constant magnetic field (for instance the main magnetic flux of the generator), and by applying the induced voltage of one or more exciter windings.

Another modification embodies the regulating of auxiliary poles so that they become magnetized by the armature winding or by conducting the current of the armature around the auxiliary poles, or a combination of both means may be provided. In both cases the current of the armature is not constant and varies approximately proportional to the number of revolutions. These modifications, therefore, are of secondary importance and will only be resorted to in the case of small type machines.

The two fluxes $\varphi_1$ and $\varphi_2$ may flow in entirely different paths, and in this case care is to be taken that the conductors of the armature of the dynamo should cut both fluxes. Conversely, the fluxes $\varphi_1$ and $\varphi_2$ may flow in paths a portion of which is common to both fluxes, and similarly fluxes can be set up by spaced poles to flow through the same yoke and the same armature (Fig. 4).

Referring to the drawings, Figs. 1 and 2 show the graphic curves of the different magnetic fluxes in the dynamo. $\varphi_1$ is the approximately constant main magnetic flux, $\varphi_2$ the variable auxiliary magnetic flux and $\varphi$ the resulting auxiliary flux. The number of revolutions $n$ varies between $n_1$ and $n_2$, constituting the range of speed variations for the dynamo. $C_2n$ and $C_3$ are the M. M. F.'s which produce the auxiliary flux. The curve $\varphi_2$ is no other than the magnetization curve of the magnetic circuit of the auxiliary flux. By a suitable selection of substance (air, cast steel, gray iron, armature iron, etc.) as well as the transverse section of the auxiliary magnetic flux circuit, it is possible, as known, to change the form of the curve $\varphi_2$. Consequently, it is always possible to obtain a curve $\varphi$ which is nearly inversely proportionate to the number of revolutions. In Fig. 2 it is assumed for the sake of example that $\varphi_1$ is not exactly constant but rises slightly with an increasing number of revolutions. In this case also by choosing an appropriate characteristic for the auxiliary magnetic circuit it is possible to obtain a good $\varphi$ curve.

In Figs. 3 and 4 the application of the invention is diagrammatically illustrated. The generator shown in Fig. 1 comprises the armature A and produces the main magnetic flux $\varphi_1$ and the auxiliary flux $\varphi_2$ by means of field coils $E_1$, $E_2$, $E_3$. The main armature winding $W_1$ is connected with the armature brushes $K_1$ and $K_2$. The auxiliary winding $W_2$ is connected to the commutator brushes $K_3$ and $K_4$. In Fig. 3, $K_3$ is an auxiliary brush on the main commutator. In order to simplify the diagrammatic views all switches have been omitted.

The generator indicated in Fig. 3 comprises a two pole dynamo electric machine, the main brushes $K_1$ and $K_2$ being in the neutral zone. In each pole pitch a main pole producing the flux $\varphi_1$ and an auxiliary pole producing the flux $\varphi_2$ are arranged. Between the main brushes an auxiliary brush $K_3$ is provided on the commutator. The armature is equipped with one armature winding only. The main pole is adapted to produce an approximately constant magnetic flux, whereas the auxiliary pole produces a variable magnetic flux flowing in a direction opposite to that of the main flux. The main pole is equipped with the main field coil $E_1$, connected to the brushes $K_1$ and $K_2$. The auxiliary pole is equipped with two field coils $E_2$, $E_3$, of which the former is connected with the brushes $K_1$ and $K_3$. As the armature coils between the brushes $K_1$ and $K_3$ cut only the approximately constant flux $\varphi_1$ it is evident that between $K_1$ and $K_3$ a voltage $C_2n$ is produced proportional to the number of revolutions. The field coil $E_3$ is connected to a source of approximately constant E. M. F. such as the main brushes $K_1$ and $K_2$ or a storage battery to produce a constant M. M. F. $C_3$ tending to set up a flux of the same direction as $\varphi_1$. The magnetizing effect of the coil $E_2$ being opposed to that of the coil $E_1$ and the magnetization curve of the auxiliary magnetic circuit being chosen as shown in Figs. 1 and 2 it is evident that between the brushes $K_1$ and $K_2$ an approximately constant voltage is produced.

The dynamo illustrated in Fig. 4 comprises main poles and auxiliary poles admitting the main flux $\varphi_1$ and the auxiliary flux $\varphi_2$ respectively. The armature A is provided with two windings, namely, the main armature winding $W_1$ equipped with the commutator brushes $K_1$ and $K_2$ and an auxiliary armature winding $W_2$ having the commutator brushes $K_3$ and $K_4$. The main winding is adapted to revolve within both magnetic fluxes $\varphi_1$ and $\varphi_2$; the auxiliary winding $W_2$ is adapted to revolve only within the constant flux $\varphi_1$ so as to produce a voltage which is proportional to the number of revolutions. The main pole contains a main field coil $E_1$ connected to the main brushes $K_1$ and $K_2$ and producing the approximately constant magnetic flux $\varphi_1$. The field coil $E_2$ of the auxiliary pole is impressed with the difference of voltage existing between the auxiliary armature winding and the main armature winding. The voltage of the auxiliary armature is proportional to the number of revolutions and the voltage of the main armature is approximately constant. It is therefore evident that the M. M. F. of the auxiliary pole is $C_2 n - C_3$. The magnetizing effect of the auxiliary field coils is opposed to that of the main field coils and in view of the magnetization curve of the auxiliary pole (Fig. 1 or 2) it is evident that the voltage produced by the main armature winding is approximately constant.

It is within the scope of the invention to provide on the auxiliary pole in addition to the field coil $E_2$ a third field coil energized by the main armature winding to increase the constant $C_3$.

If a strictly constant voltage is not required, but rather a voltage which rises and falls slightly with the number of revolutions, this may be obtained by a suitable selection of the materials, etc., for the auxiliary magnetic circuit. For example, in the case of train illumination it is sometimes required that upon greater speed the lights should shine brighter, and in such cases the voltage is permitted to rise slightly with the increasing number of revolutions. It is, of course, impossible to produce a $\varphi$ curve which conforms closely to the ideal $\varphi$ curve, and for this reason certain deviations from the desired voltage curve must be taken into consideration.

The drawings disclose merely the preferred form of the embodiment of the invention, but obvious changes and alterations are included and the invention is only limited by the scope of the appended claims.

I claim:

1. In a continuous current dynamo, main and auxiliary field poles and energizing coils therefor, an armature having a main winding arranged in the magnetic fields of the main and auxiliary poles and included in circuit with said main field coils, said armature also having an auxiliary winding arranged solely in the magnetic field of the main field poles and included in series with the auxiliary field coils across the main armature winding, and a storage battery in parallel with the main field coils.

2. In a continuous current dynamo, an armature having independent main and auxiliary windings, main and auxiliary field poles, main field coils connected to said main winding, auxiliary field coils connected in series with the said auxiliary winding across the main armature winding, said field poles and coils being so arranged as to cause the magnetizing effect of the auxiliary field coils to be opposed to that of the main field coils, and constant voltage impressing means for said main field coils.

3. In a continuous current dynamo, main and auxiliary field poles, coils energizing said main and auxiliary field poles, said field poles and coils being so arranged as to cause the magnetizing effect of the auxiliary field coils to be opposed to that of the main field coils, an armature having independent main and auxiliary windings, said main windings being arranged in the magnetic fields of both the main and auxiliary field poles, to produce an approximately constant voltage, and being included in circuit with said main field coils, said auxiliary winding being arranged solely in the magnetic field of the main field poles to produce a voltage proportional to the speed of rotation of the armature, said last named winding being connected in series with the auxiliary field coils across the main armature winding, whereby the auxiliary field coils are impressed with a voltage equal to the difference of the voltages of the main and auxiliary armature windings, and means for impressing said main field coils with a constant voltage opposed to the voltage of the main armature winding.

In testimony whereof I affix my signature in presence of two witnesses.

FRITZ KESSELRING.

Witnesses:
G. KOESTLER,
H. HEIERLI TUG.